(12) United States Patent
Bischoff et al.

(10) Patent No.: US 9,853,592 B2
(45) Date of Patent: Dec. 26, 2017

(54) METHOD AND DEVICE FOR CONTROLLING AN ENERGY-GENERATING SYSTEM WHICH CAN BE OPERATED WITH A RENEWABLE ENERGY SOURCE

(71) Applicant: Siemens Aktiengesellschaft, Munich (DE)

(72) Inventors: Martin Bischoff, Holzkirchen (DE); Terrence Chen, Princeton, NJ (US); Ralph Grothmann, Munich (DE); Oliver Hennig, Munich (DE); Johann Kim, Erlangen (DE); Eberhard Ritzhaupt-Kleissl, Baiersdorf (DE)

(73) Assignee: Siemens Aktiengesellschaft, Munich (DE)

(*) Notice: Subject to any disclaimer, the term of this patent is extended or adjusted under 35 U.S.C. 154(b) by 225 days.

(21) Appl. No.: 14/764,102

(22) PCT Filed: Dec. 3, 2013

(86) PCT No.: PCT/EP2013/075305
§ 371 (c)(1),
(2) Date: Jul. 28, 2015

(87) PCT Pub. No.: WO2014/121863
PCT Pub. Date: Aug. 14, 2014

(65) Prior Publication Data
US 2015/0381103 A1 Dec. 31, 2015

Related U.S. Application Data

(60) Provisional application No. 61/760,766, filed on Feb. 5, 2013.

(51) Int. Cl.
*H01L 31/04* (2014.01)
*G05B 13/02* (2006.01)
(Continued)

(52) U.S. Cl.
CPC ............. *H02S 10/00* (2013.01); *G05B 13/027* (2013.01); *G05B 17/00* (2013.01); *G06Q 10/08* (2013.01); *Y02E 10/50* (2013.01); *Y04S 10/56* (2013.01)

(58) Field of Classification Search
CPC ....... H02S 10/00; G05B 13/027; G05B 17/00; Y02E 10/50; Y04S 10/56; G06Q 10/08
See application file for complete search history.

(56) References Cited

U.S. PATENT DOCUMENTS

2009/0113049 A1* 4/2009 Nasle .................. G05B 13/026
709/224
2010/0198420 A1 8/2010 Rettger
(Continued)

FOREIGN PATENT DOCUMENTS

CN 102521670 A 6/2012
CN 102567809 A 7/2012
(Continued)

OTHER PUBLICATIONS

CN Office Action dated Dec. 29, 2016, for CN patent application No. 2013800722730.
(Continued)

*Primary Examiner* — Ramesh Patel
(74) *Attorney, Agent, or Firm* — Beusse Wolter Sanks & Maire (57) ABSTRACT

A method and a device for controlling an energy-generating system are operated with a renewable energy source. In the method, a prediction about an energy yield of the energy-generating system is made for a predefined prediction time period, and a predefined area, using a learning system with an input vector and an output vector. The output vector includes operating variables for a multiplicity of successive future times of the time period. The input vector includes variables, influencing the operating variables, for a point in
(Continued)

time from a multiplicity of points in time of a predefined observation time period. The input variables include at least three items of information for the observation time period and the predefined area. The energy-generating system is controlled on the basis of the generated prediction such that weather-conditioned fluctuations in the energy yield of the energy-generating system are reduced.

15 Claims, 4 Drawing Sheets

(51) Int. Cl.
*H02S 10/00* (2014.01)
*G05B 17/00* (2006.01)
*G06Q 10/08* (2012.01)

(56) References Cited

U.S. PATENT DOCUMENTS

| | | | |
|---|---|---|---|
| 2011/0231320 A1* | 9/2011 | Irving | G06Q 30/00 705/80 |
| 2011/0259396 A1* | 10/2011 | Hoffman | H01L 31/0543 136/246 |
| 2011/0276269 A1 | 11/2011 | Hummel | |
| 2013/0093193 A1* | 4/2013 | Schmidt | H02J 3/38 290/1 R |
| 2014/0046610 A1* | 2/2014 | Bamberger | H02J 3/383 702/60 |
| 2015/0019034 A1* | 1/2015 | Gonatas | H01L 31/02021 700/291 |
| 2015/0317589 A1* | 11/2015 | Anderson | G06Q 10/08 705/7.25 |

FOREIGN PATENT DOCUMENTS

| | | |
|---|---|---|
| CN | 102567809 B | 12/2015 |
| JP | 2007184354 A | 7/2007 |
| WO | 2011124720 A2 | 10/2011 |

OTHER PUBLICATIONS

Lorenz, et al., Methoden zur Beschreibung der Wolkenentwicklung in Satellitenbildern und ihre Anwendung zur Solarstrahlungsvorhersage, Internet, Jan. 22, 2004; XP002722276; http://oops.uni-oldenburg.de/135/79/lormet05.pdf; [gefunden am Mar. 26, 2014]; Kapitel 1-4, 6; Dissertation.

* cited by examiner

METHOD AND DEVICE FOR CONTROLLING AN ENERGY-GENERATING SYSTEM WHICH CAN BE OPERATED WITH A RENEWABLE ENERGY SOURCE

CROSS REFERENCE TO RELATED APPLICATIONS

This application is the US National Stage of International Application No. PCT/EP2013/075305 filed 3 Dec. 2013, and claims the benefit thereof. The International Application claims the benefit of U.S. Provisional Application No. U.S. 61/760,766 filed 5 Feb. 2013. All of the applications are incorporated by reference herein in their entirety.

FIELD OF INVENTION

The present invention relates to a method and a device for controlling an energy-generating system which can be operated with a renewable energy source.

BACKGROUND OF INVENTION

Renewable energy-generating systems are used with increasing frequency in the electrical energy-generating sector. The energy yield of such energy-generating systems depends heavily on external variables, in particular weather conditions. It is therefore desirable for renewable energy-generating systems of this type to predict in a suitable manner the energy quantity generated in future in order to be able as a result to plan the energy feed of an energy-generating system of this type and therefore the operation of a power network more effectively.

SUMMARY OF INVENTION

One object of the invention is therefore to improve the control of an energy-generating system which can be operated with a renewable energy source.

Accordingly, a method is proposed for controlling an energy-generating system which can be operated with a renewable energy source. In the method, a computer-supported generation of a prediction of an energy yield of the energy-generating system is carried out for a predefined prediction period and a predefined area using a learning system with an input vector and an output vector. The output vector comprises one or more operating variables of the energy-generating system for a plurality of consecutive future times of the predefined prediction period. The input vector comprises one or more input variables influencing the operating variable or operating variables for one time from a plurality of times of a predefined observation period. The input variables comprise at least three of the following data for the predefined observation time period and the predefined area: weather data; first image data of a cloud drift provided by a satellite; second image data of the cloud drift provided by a ground camera; and simulation data generated by a physical model for simulating the energy yield of the energy-generating system using the weather data. Furthermore, in the method, the energy-generating system is controlled on the basis of the generated prediction in such a way that weather-related fluctuations in the energy yield of the energy-generating system are reduced.

The energy-generating system which can be operated with a renewable energy source is, for example, a power station or a hybrid power station such as a photovoltaic power station or a solar thermal energy power station.

A learning system is a system that can adapt its characteristics depending on its inputs and outputs. It is thus possible, for example, to train a learning system by a set of training data so that it can recognize specific, predefined or automatically to be determined patterns or generalizable structures in the training data. After the learning phase, a learning system of this type is able to recognize the patterns to be determined or generalizable structures in data other than the training data also and to classify these other data accordingly.

The operating variables of the energy-generating system are, for example, energy quantities generated by the energy-generating system.

The methods enables the energy quantity to be generated in future to be predicted in a suitable manner in order to be able to plan the energy feed of an energy-generating system of this type and therefore the operation of a power network more effectively.

Furthermore, the method enables the energy-generating system to be controlled on the basis of the generated prediction in such a way that weather-related fluctuations in the energy yield of the energy-generating system are reduced or prevented.

A further advantage of the method lies in the possibility of using at least three different data sources for the prediction that is to be generated. In this way, the advantages of the different data sources, such as, for example, the accuracy and/or error tolerance of individual measurement points, time frame or time resolution, can be combined. The generated prediction is thus more accurate and more stable than with the use of only one or only two data sources.

In embodiments of the method, the input vector is compressed before the generation of the prediction through a principal component analysis of the components of the learning system.

Principal component analysis is a statistical method for loss-free compression of the data comprised by the input vector. The use of a non-linear principal component analysis, which is implemented in the form of a learning system, for example a neural network, is particularly advantageous. In this way, very large input vectors can also be efficiently and quickly processed.

In further embodiments of the method, the learning system is formed by a number n of neural networks.

Neural networks are universal function approximators, the structure of which is selected in accordance with biological nerve cells.

Neural networks are suitable in particular for controlling and regulating technical systems such as the energy-generating system.

It is possible to replace conventional controllers with neural networks or to specify reference values for them which a neural network has determined from the generated prediction.

It is thus furthermore possible to control the energy-generating system on the basis of the generated prediction in such a way that weather-related fluctuations in the energy yield of the energy-generating system are even further reduced.

Neural networks furthermore enable prediction errors to be minimized over time, thereby improving the ultimately generated prediction.

The n neural networks may have identical or different architectures.

In further embodiments of the method, the input vector for the i-th neural network, with $i \in [1, \ldots, n]$, comprises the output vector of the (i−1)th neural network in addition to the input variables.

The learning system therefore includes a sequence of independent, self-learning subsystems in the form of neural networks. In addition to the input variables comprised by the respective input vector, each subsystem, with the exception of the first subsystem, receives the generated prediction of the respective preceding subsystem as further input data. In this way, the prediction errors of the preceding subsystems can be reduced by the respective subsequent subsystem.

In further embodiments of the method, each of the n neural networks is designed as an artificial neural feed-forward network with a plurality of interconnected layers which comprise an input layer, a plurality of hidden layers and an output layer, wherein the input layer contains a number of input neurons to describe the input vectors and wherein a respective hidden layer contains a number of hidden neurons and wherein the output layer contains a number of output neurons to describe the output vectors, and wherein the output layer comprises a plurality of output clusters corresponding to the plurality of hidden layers and in each case comprising one or more output neurons, wherein each output cluster describes the same output vector and is connected to a different hidden layer.

Each of the n neural networks thus represents a special variant of a feed-forward network. A feed-forward network is characterized in that a plurality of neuron layers overlaying one another are coupled to one another in the form of weight matrices via suitable weights in one processing direction from lower to higher layers, wherein the neurons within one layer have no interconnections.

Each of the n neural networks is characterized in that the output layer comprises a plurality of output clusters corresponding to the plurality of hidden layers and in each case comprising one or more output neurons, wherein each output cluster describes the same output vector and is connected to a different hidden layer. An output cluster is thus allocated to each hidden layer, wherein the hidden layer is coupled only to this output cluster. Consequently, separate output clusters are created which describe the same operating variables of the energy-generating system independently from one another in the neural network.

In contrast to conventional feed-forwards networks, in the neural network according to the invention the hidden layers lying below the uppermost hidden layer are connected not only to a higher hidden layer, but also to an output cluster of the output layer. As a result, additional error information is fed to the output layer, so that a correspondingly trained neural network can better predict the operating variables of the energy-generating system. The input vector is connected to each hidden layer.

In further embodiments of the method, the data comprised by the input variables are provided individually for each of the n neural networks.

Each subsystem thus has specific characteristics of the input variables as input data. For example, the input variables for the first subsystem correspond to a high time resolution of the observed weather data, resulting in a short-term prediction, whereas the input variables for the second subsystem correspond to a low time resolution of the observed weather data and thus result in a long-term prediction. High time resolution means, for example, a time resolution accurate to the minute or hour, whereas low time resolution means, for example, a resolution accurate to the day.

In further embodiments of the method, a sequence of the n neural networks is predefinable.

A sorting of the subsystems corresponding to the input data, for example in terms of the quality, time frame or time resolution of the data comprised by the input variables, enables the quality of the generated prediction to be further improved.

In further embodiments of the method, a multiple execution of the step of generating a prediction is effected in order to generate a plurality of predictions, wherein a different prediction period and/or a different observation period is specified in each case for the generation of a respective prediction.

A plurality of different predictions can be generated in this way.

In further embodiments of the method, the plurality of generated predictions are amalgamated to form an amalgamated prediction.

Through the amalgamation of the plurality of generated predictions to form an amalgamated prediction, it is possible to further improve the quality of the ultimately generated, amalgamated prediction.

In further embodiments of the method, the plurality of generated predictions are amalgamated by a weighted summation.

A weighted summation allows, for example, each of the plurality of generated predictions to be equally weighted. However, it is also possible to weight one or more of the plurality of generated predictions more heavily than others in order to increase the influence of the respective predictions on the amalgamated prediction. In this way, for example, predictions based on more accurate or reliable data can be more heavily weighted than predictions based on inaccurate or less reliable data, without having to forego the use of the inaccurate or less reliable data.

In further embodiments of the method, the plurality of generated predictions are amalgamated by a further neural network.

A neural network is particularly suitable for processing and evaluating statistical data such as observed weather data. The amalgamated prediction can thus be further improved.

In further embodiments of the method, the first and/or the second image data comprise image features provided by a pattern recognition.

Pattern recognition is a particularly suitable method for evaluating images. The image features provided by the pattern recognition represent a summary of the relevant information in the image data by which the method is designed more efficiently.

Furthermore, a computer program product is proposed which initiates the performance of a corresponding method on a program-controlled device.

A computer program product such as a non-transitory computer readable media can be provided or supplied, for example, as a storage medium, such as a memory card, USB stick, CD-ROM, DVD or in the form of a downloadable file from a server in a network. This may be carried out, for example, in a wireless communication network through the transmission of a corresponding file with the computer program product. In particular, a device as described below can be considered as a program-controlled device.

Furthermore, a data medium is proposed with a stored computer program with commands which initiates the performance of a corresponding method on a program-controlled device.

Furthermore, a device is proposed for controlling an energy-generating system which can be operated with a renewable energy source. The device comprises a prediction generator adapted to generate a prediction relating to an energy yield of the energy-generating system for a predefined prediction period and a predefined area using a learning system with an input vector and an output vector. The output vector comprises one or more operating variables of the energy-generating system for a plurality of consecutive future times of the predefined prediction period. The input vector comprises one or more input variables influencing the operating variable or operating variables for one time from a plurality of times of a predefinable observation period. The input variables comprise at least three of the following data for the predefined observation time period and the predefined area:—weather data,—first image data of a cloud drift provided by a satellite,—second image data of the cloud drift provided by a ground camera, and—simulation data generated by a physical model for simulating the energy yield of the energy-generating system using the weather data.

The device furthermore comprises a controller adapted to control the energy-generating system on the basis of the generated prediction in such a way that weather-related fluctuations in the energy yield of the energy-generating system are reduced.

The device enables the energy quantity generated in future to be predicted in a suitable manner in order to be able to plan the energy feed of an energy-generating system of this type and therefore the operation of a power network more effectively as a result.

Furthermore, the device enables the energy-generating system to be controlled on the basis of the generated prediction in such a way that weather-related fluctuations in the energy yield of the energy-generating system are reduced.

The respective prediction generator and controller can be implemented through hardware and/or software. In the case of a hardware implementation, the respective unit can be designed as a device or as part of a device, for example as a computer or as a microprocessor. In the case of a software implementation, the respective unit can be designed as a computer program product, as a function, as a routine, as part of a program code or as an executable object.

Further possible implementations of the invention also comprise combinations, not explicitly mentioned, of method steps, features or embodiments of the method or the device described above or below in relation to the example embodiments. The person skilled in the art will also add or modify individual aspects as improvements or supplements to the respective basic form of the invention.

The characteristics, features and advantages of this invention described above and the manner in which these are achieved will become clearer and more readily understandable in connection with the following description of the example embodiments which are explained in detail with reference to the drawings.

DETAILED DESCRIPTION OF INVENTION

In the figures, the same elements or elements having the same function are denoted with the same reference numbers, unless otherwise indicated.

Figure 1:
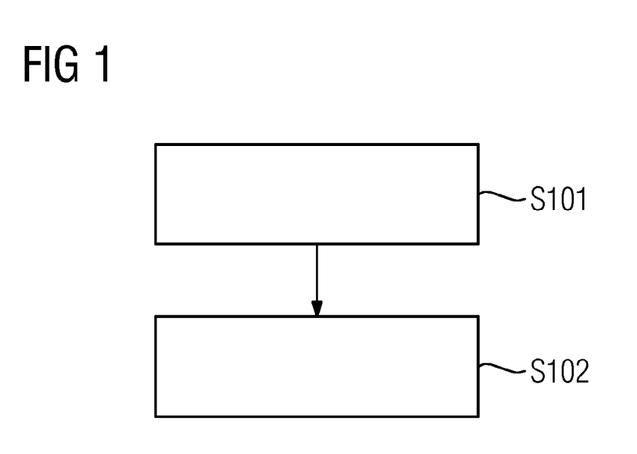
FIG. 1 shows a flow diagram of an example embodiment of a method for controlling an energy-generating system which can be operated with a renewable energy source.

FIG. 1 shows a flow diagram of an example embodiment of a method for controlling an energy-generating system which can be operated with a renewable energy source.

In a first step S101, a prediction relating to the energy yield of the energy-generating system is generated for a predefined prediction period and a predefined area using a learning system with an input vector and an output vector. The output vector comprises one or more operating variables of the energy-generating system for a plurality of consecutive future times of the predefined prediction period. The input vector comprises one or more input variables influencing the operating variable or operating variables for one time from a plurality of times of a predefined observation period. The input variables comprise at least three of the following data for the predefined observation time period and the predefined area: weather data; first image data of a cloud drift provided by a satellite; second image data of the cloud drift provided by a ground camera; and simulation data generated by a physical model for simulating the energy yield of the energy-generating system using the weather data.

In a second step S102, the energy-generating system is controlled on the basis of the generated prediction in such a way that weather-related fluctuations in the energy yield of the energy-generating system are reduced.

Figure 2:
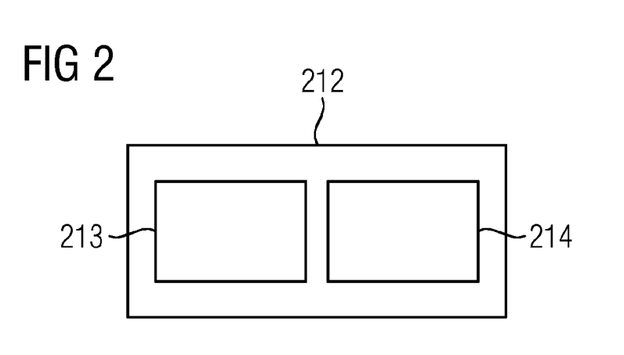
FIG. 2 shows a block diagram of an example embodiment of a device for controlling an energy-generating system which can be operated with a renewable energy source.

FIG. 2 shows a block diagram of an example embodiment of a device 212 for controlling an energy-generating system which can be operated with a renewable energy source.

The device 212 comprises a prediction-generator 213 adapted to generate a prediction relating to an energy yield of the energy-generating system for a predefined prediction period and a predefined area, and also a controller 214 adapted to control the energy-generating system on the basis of the generated prediction.

Figure 3:
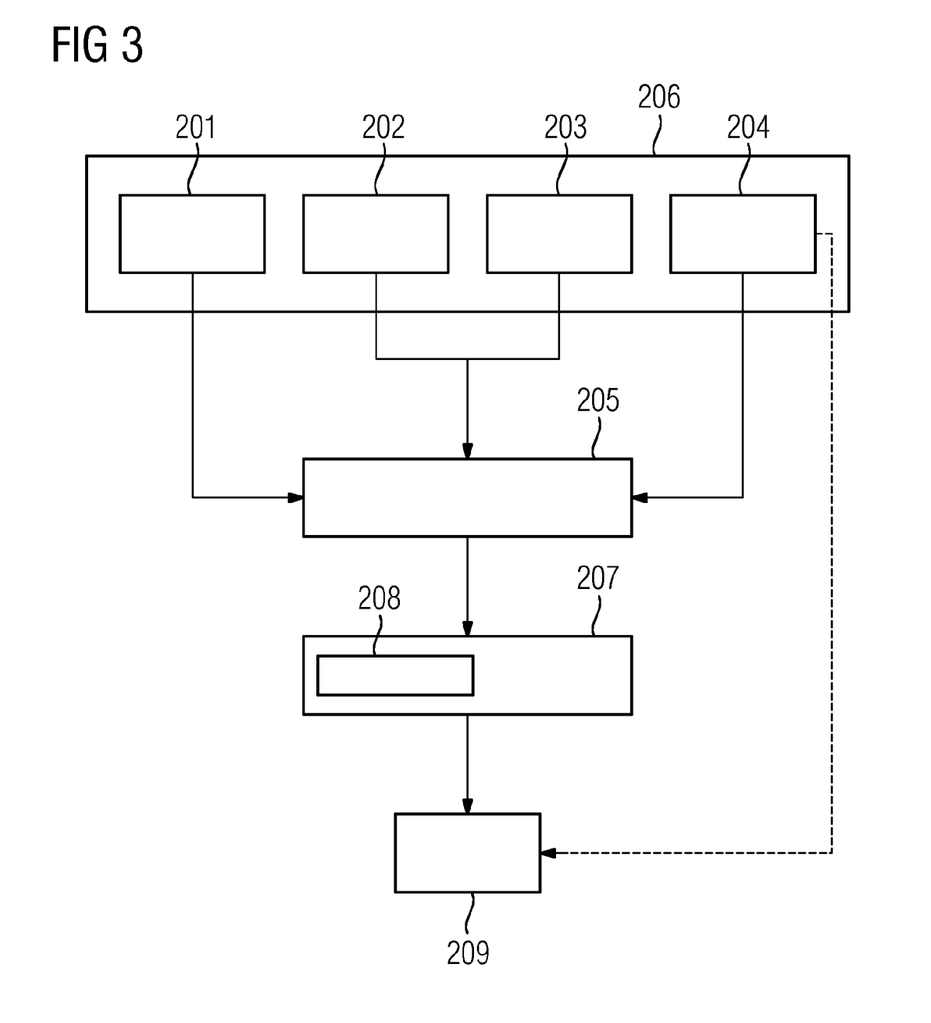
FIG. 3 shows a block diagram of a first example embodiment of a learning system for a method for controlling an energy-generating system which can be operated with a renewable energy source.

FIG. 3 shows a block diagram of a first example embodiment of a learning system for a method for controlling an energy-generating system which can be operated with a renewable energy source.

The learning system 205 has an input vector 206 and an output vector 207. The input vector 206 comprises a plurality of input variables influencing the operating variable or operating variables 208 for one time from a plurality of times of a predefined observation period. The input variables comprise data such as weather data 201, first image data 202 and second image data 203. The first image data 202 are image data of a cloud drift provided by a satellite. The second image data 203 are image data of the cloud drift provided by a ground camera. Furthermore, the input data comprise simulation data 204. The simulation data 204 are generated by a physical model for simulating the energy yield of the energy-generating system using the weather data 201.

The data 201-204 first undergo a processing. For example, cloud images recorded by the satellite and by the ground camera are subjected to a pattern recognition. The image features or image data provided by the pattern recognition represent a summary of the relevant information contained in the cloud images relating to the weather conditions of the predefined area.

Following the processing, a set of characteristic, numerical values is present as respective data 201-204. These data 201-204 form the input for the learning system 205. The output of the learning system 205 is formed by the output vector 207 with the operating variables 208. The output vector 207 thus serves to generate the prediction 209.

It is possible to use the simulation data 204 alternatively or additionally for the input into the learning system 205 for a correction of the generated prediction 209, indicated by the broken arrow in FIG. 3. It is thus possible to correct any improbable or implausible prediction results by the simulation data 204.

Figure 4:
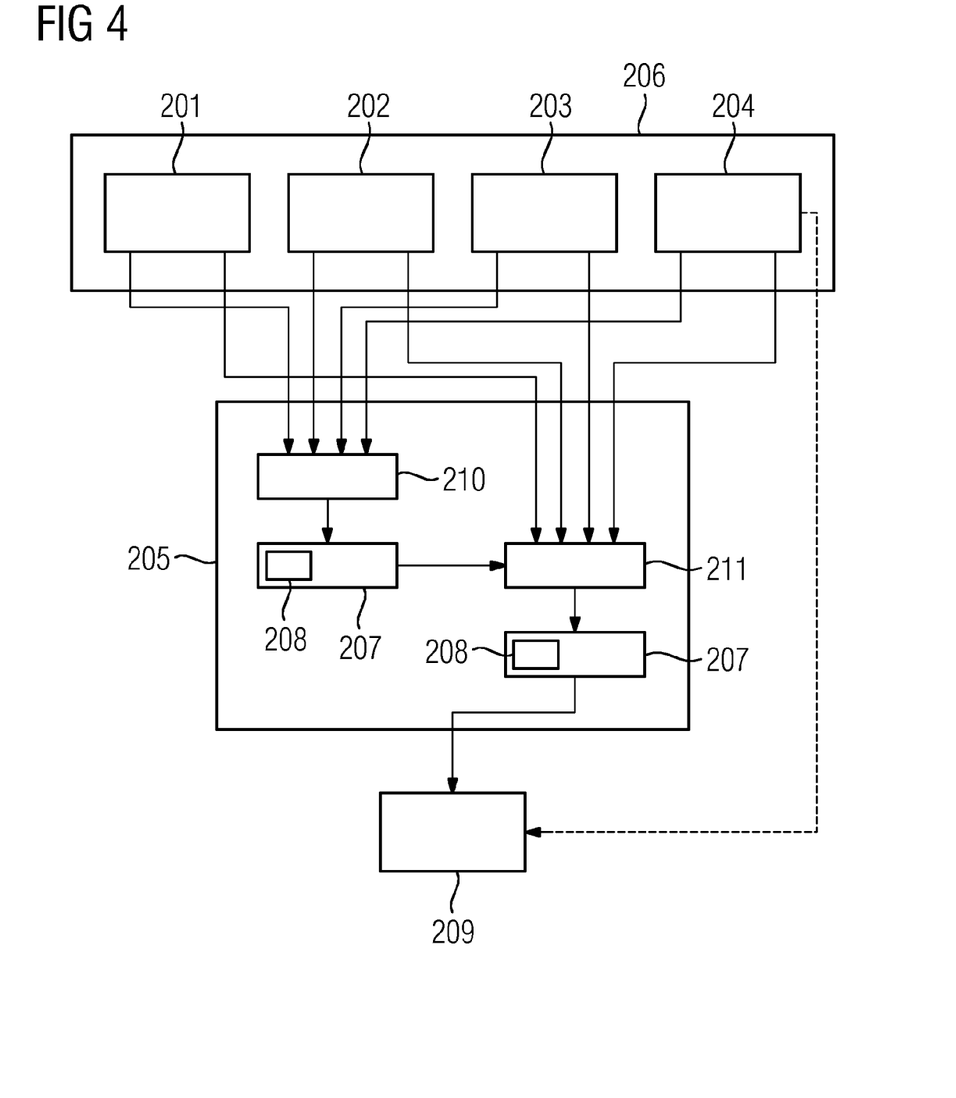
FIG. 4 shows a block diagram of a second example embodiment of a learning system for a method for controlling an energy-generating system which can be operated with a renewable energy source.

FIG. 4 shows a block diagram of a second example embodiment of a learning system for a method for controlling an energy-generating system which can be operated with a renewable energy source.

In the example embodiment shown, the learning system 205 comprises two neural networks 210, 211. Each of the two neural networks 210, 211 has the input vector 206 as input. In the present case, both neural networks 210, 211 thus use the same input vector 206.

It is also conceivable for each of the two neural networks 210, 211 to have its own input vector as input, wherein, for example, the input vector for the first neural network 210 comprises data of a low time resolution of the observed weather data, whereas the input vector for the second neural network 211 comprises data of a higher time resolution of the observed weather data. This corresponds to an individual provision of the data 201-204 comprised by the input variables for each of the two neural networks 210, 211.

In addition to the data 201-204 of the input vector, the second neural network 211 receives the output vector of the first neural network 210 as input.

The example embodiment shown in FIG. 4 thus represents a correcting system. This system includes a sequence of independent, self-learning subsystems in the form of the two neural networks 210, 211. As input data, each subsystem can have separate data sources in terms of the input vectors described above comprising different characteristics of data 201-204. In addition, each subsystem, with the exception of the first, receives the prediction of the preceding system in the form of the respective output vector as further input data. In this way, prediction errors of the preceding system can be reduced by the respectively following subsystem.

In order to improve the prediction quality, the subsystems can be sorted according to the input data, for example in terms of their quality, their time frame or their time resolution.

After each application of one of the subsystems or neural networks 210, 211, an independent prediction is available in the form of the respective output vector 207. It is therefore not necessary to run through the entire cascade of neural networks 210 211.

Figure 5:
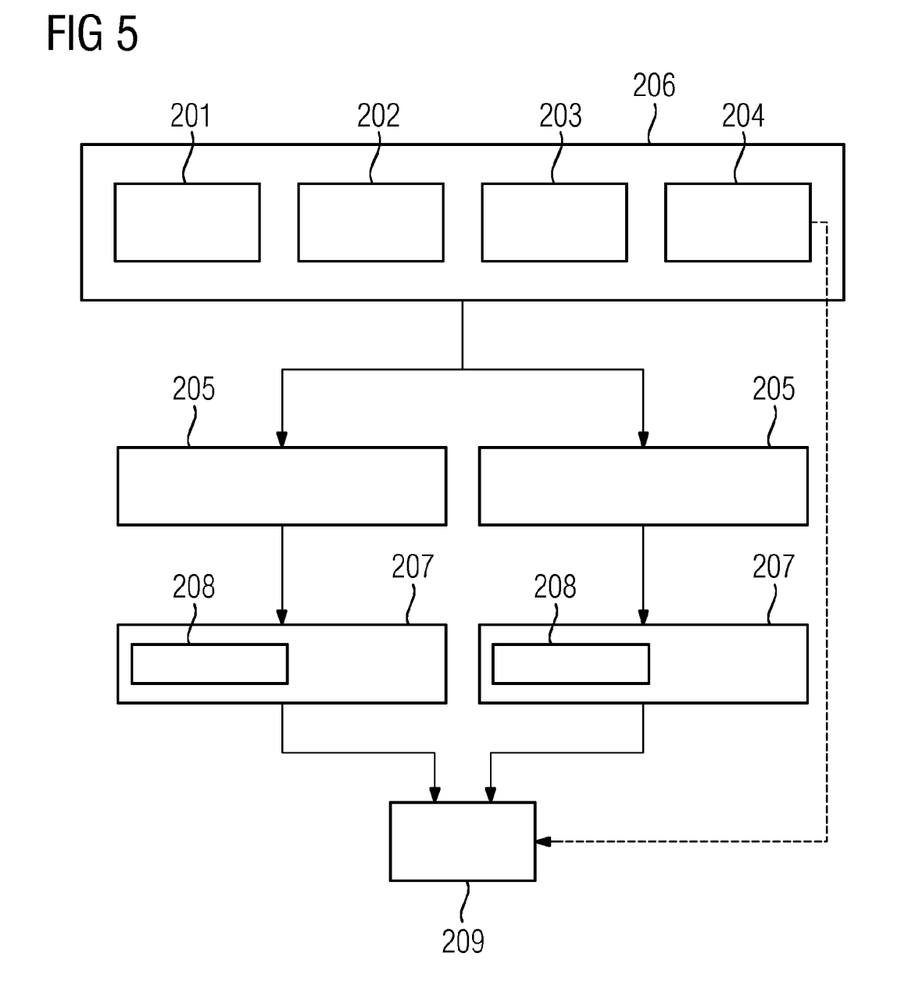
FIG. 5 shows a block diagram of a third example embodiment of a learning system for a method for controlling an energy-generating system which can be operated with a renewable energy source.

FIG. 5 shows a block diagram of a third example embodiment of a learning system for a method for controlling an energy-generating system which can be operated with a renewable energy source.

In this third example embodiment, two independent learning systems 205 are used. Each of the two learning systems 205 has the data 201-204 of the input vector 206 as input data.

Alternatively, here also, each of the two learning systems 205 can also have separate data sources in terms of the input vectors described above comprising different characteristics of data 201-204 as input data here also.

The output vectors 207 of each of the two learning systems 205 are amalgamated to form an amalgamated prediction 209. The amalgamation can be effected, for example, by a weighted summation or by a further learning system such as, for example, a neural network. A selection of one of the two predictions of the independent learning systems 205 based on one of the two output vectors 207 according to defined criteria is also possible.

A complete learning system of this type is therefore able to define a complete prediction 209 and learn the conditions under which a given prediction has the highest probability.

Although the invention has been illustrated and described in detail by means of the preferred example embodiment, the invention is not restricted by the disclosed examples and other variations can be derived herefrom by the person skilled in the art without departing from the scope of protection of the invention.

The invention claimed is:

1. A method for controlling an energy-generating system which can be operated with a renewable energy source, comprising:

generating a prediction of an energy yield of the energy-generating system for a predefined prediction period and a predefined area using a learning system formed by a number n of neural networks each with an input vector and an output vector, wherein the output vector comprises one or more operating variables of the energy-generating system for a plurality of consecutive future times of the predefined prediction period, and wherein the input vector comprises one or more input variables influencing the operating variable or operating variables for one time from a plurality of times of a predefined observation period, wherein each of the n neural networks comprises an artificial neural feed-forward network with a plurality of interconnected layers which comprise an input layer, a plurality of hidden layers and an output layer, wherein the input layer contains a number of input neurons to describe the input vectors, wherein a respective hidden layer contains a number of hidden neurons and wherein the output layer contains a number of output neurons to describe the output vectors, wherein the output layer comprises a plurality of output clusters corresponding to the plurality of hidden layers and in each case comprising one or more output neurons, wherein each output cluster describes the same output vector and is connected to a different hidden layer, wherein the input variables comprise at least three of the following data for the predefined observation period and the predefined area:

weather data, first image data of a cloud drift provided by a satellite, second image data of the cloud drift provided by a ground camera, and simulation data generated by a physical model for simulating the energy yield of the energy-generating system using the weather data, and controlling the energy-generating system on the basis of the generated prediction such that weather-related fluctuations in the energy yield of the energy-generating system are reduced.

2. The method as claimed in claim 1, wherein the input vector is compressed before the generation of the prediction through a principal component analysis of the components of the learning system.

3. The method as claimed in claim 1, wherein the input vector for an i-th neural network, with i∈[1, . . . , n], comprises the output vector of the (i−1)th neural network in addition to the input variables.

4. The method as claimed in claim 1, wherein the input variables are provided individually for each of the n neural networks.

5. The method as claimed in claim 1, wherein a sequence of the n neural networks is predefinable.

6. The method as claimed in claim 1, further comprising multiple execution of the step of generating a prediction in order to generate a plurality of predictions, wherein a different prediction period and/or a different observation period is specified in each case for the generation of a respective prediction.

7. The method as claimed in claim 6, wherein the plurality of generated predictions are amalgamated to form an amalgamated prediction.

8. The method as claimed in claim 7, wherein the plurality of generated predictions are amalgamated by a weighted summation.

9. The method as claimed in claim 7, wherein the plurality of generated predictions are amalgamated by a further neural network.

10. The method as claimed in claim 1, wherein the first and/or the second image data comprise image features provided by a pattern recognition.

11. A computer program product embodied on a non-transitory computer-readable media, adapted to implement the method as claimed in claim 1 on a program-controlled device.

12. A non-transitory data medium with a stored computer program thereon adapted to implement the method as claimed in claim 1 on a program-controlled device.

13. The method of claim 1, wherein one of the at least three of said following data comprises the first image data of the cloud drift provided by the satellite.

14. A device for controlling an energy-generating system which can be operated with a renewable energy source, comprising:
a prediction generator adapted to generate a prediction relating to an energy yield of the energy-generating system for a predefined prediction period and a predefined area using a learning system formed by a number n of neural networks each with an input vector and an output vector,
wherein the output vector comprises one or more operating variables of the energy-generating system for a plurality of consecutive future times of the predefined prediction period, and
wherein the input vector comprises one or more input variables influencing the operating variable or operating variables for one time from a plurality of times of a predefinable observation period,
wherein each of the n neural networks comprises an artificial neural feed-forward network with a plurality of interconnected layers which comprise an input layer, a plurality of hidden layers and an output layer,
wherein the input layer contains a number of input neurons to describe the input vectors,
wherein a respective hidden layer contains a number of hidden neurons and wherein the output layer contains a number of output neurons to describe the output vectors,
wherein the output layer comprises a plurality of output clusters corresponding to the plurality of hidden layers and in each case comprising one or more output neurons,
wherein each output cluster describes the same output vector and is connected to a different hidden layer,
wherein the input variables comprise at least three of the following data for the predefined observation time period and the predefined area:
weather data,
first image data of a cloud drift provided by a satellite,
second image data of the cloud drift provided by a ground camera, and
simulation data generated by a physical model for simulating the energy yield of the energy-generating system using the weather data, and
a controller adapted to control the energy-generating system on the basis of the generated prediction in such a way that weather-related fluctuations in the energy yield of the energy-generating system are reduced.

15. The device of claim 14, wherein one of the at least three of said following data comprises the first image data of the cloud drift provided by the satellite.

* * * * *